Feb. 2, 1971   J. W. BRACKEN, JR   3,559,264

REGENERATOR SPACER MANUFACTURE

Filed Nov. 25, 1968   2 Sheets-Sheet 1

INVENTOR.
Joseph W. Bracken, Jr.
BY
Paul Fitzpatrick
ATTORNEY

Feb. 2, 1971   J. W. BRACKEN, JR   3,559,264
REGENERATOR SPACER MANUFACTURE
Filed Nov. 25, 1968   2 Sheets-Sheet 2
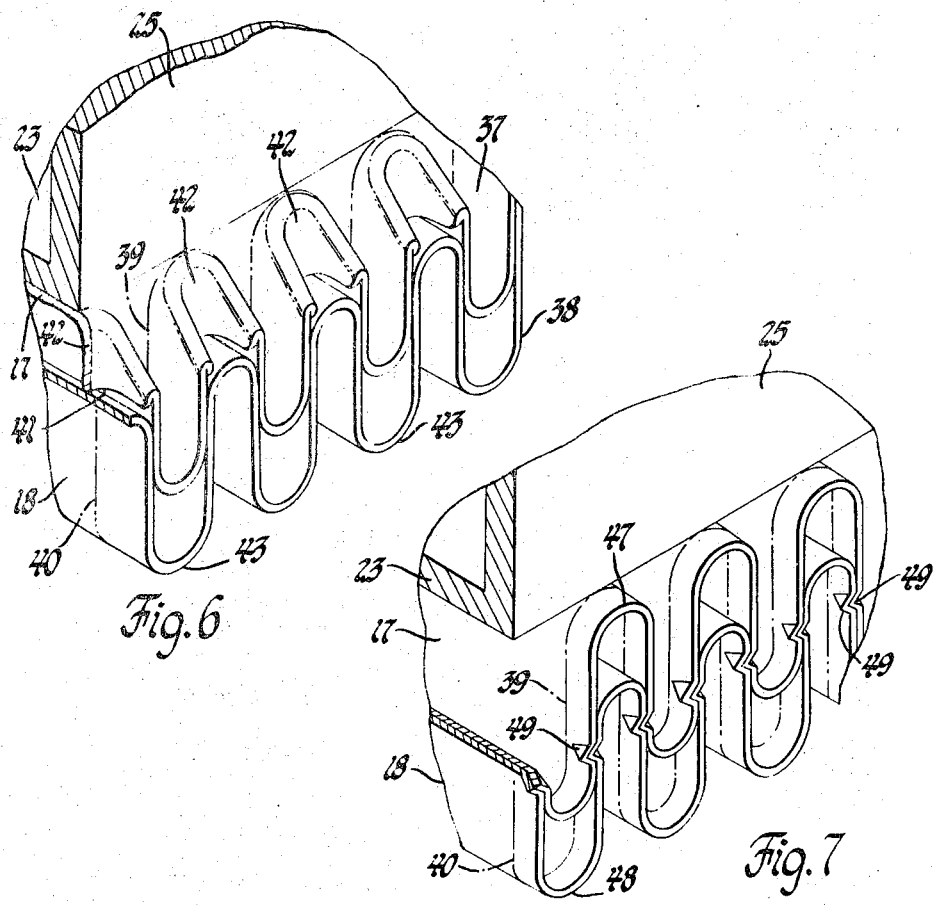
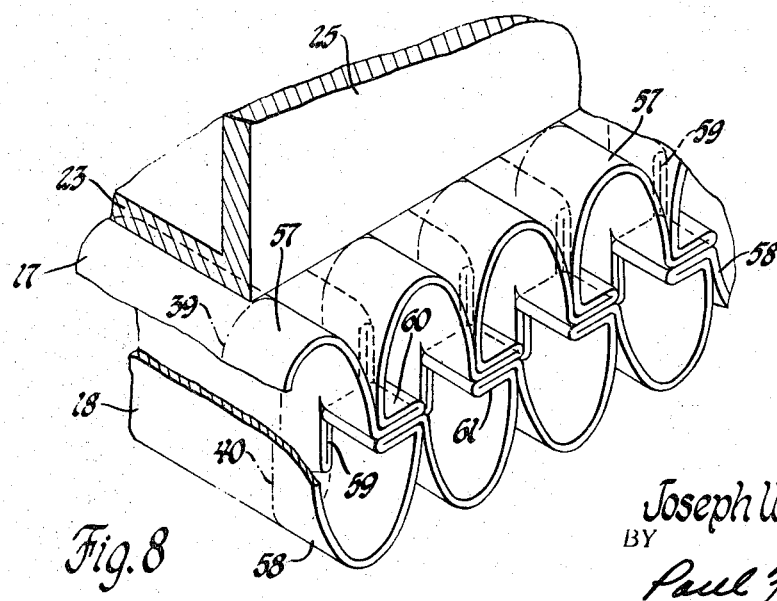
INVENTOR.
Joseph W. Bracken, Jr.
BY
Paul Fitzpatrick
ATTORNEY 3,559,264
REGENERATOR SPACER MANUFACTURE
Joseph W. Bracken, Jr., Redford Township, Mich., assignor to General Motors Corporation, Detroit, Mich.
Filed Nov. 25, 1968, Ser. No. 778,398
Int. Cl. B21d *53/00;* B21k *29/00;* B23p *15/26*
U.S. Cl. 29—157.3                                        12 Claims

ABSTRACT OF THE DISCLOSURE

A radial-flow rotary regenerator matrix includes an outer sealing ring or outer rim. A radially yieldable structure disposed between this sealing ring or rim and the heat transfer body of the matrix is made up of two interdigitated corrugated strips which may slide radially one within the other.

---

The corrugated sheets are bonded to the adjacent radially outer and inner structures. Sliding of the corrugations of one strip into the other during manufacture is limited by bent or deformed portions on one or both of the corrugated strips which thus assure firm contact at each corrugation with the adjacent structure to which the corrugated strips are bonded. After the bonding, the deformed portions are removed by machining.

My invention relates to the manufacture of metal structures having provision for relative movement or expansion between the parts embodying interleaved corrugated sheets or strips which permit relative movement of the corrugations of one sheet into the corrugations of the other. When it is desired to bond or otherwise fix such corrugated sheets to the adjacent structures, there is a problem of maintaining the proper relation of parts because of the ability of the corrugations to collapse one into the other. The problem is particularly notable with annular structures such as one in which the corrugated sheets are disposed between two circular bands or shells, but the same sort of problem can arise in the manufacture of generally plane structures.

My invention is particularly suited to, and is described herein as applied to, the manufacture of the rotary regenerator matrix of my copending patent application Ser. No. 744,985 filed Nov. 12, 1968 for Regenerator Spacer. However, as will be apparent, it is applicable to other structures presenting the same sort of problem.

The principal purpose of my invention is to provide a readily fabricated, reliable, and inexpensive connection between relatively expansible parts of a matrix or other structure. This purpose is achieved by provision of two corrugated sheets or strips with the corrugations of the two strips interfitting so that the peaks of the corrugations of each strip enter variably into the valleys between the corrugations of the other strip, thus providing a sort of spline connection bebtween these two parts which allows relative movement. The corrugated sheets are fixed to adjacent bands or sheets which are thus relatively movable.

The principal objects of my invention are to provide a suitable process for the manufacture of structures having variably interleaved corrugations, to provide a process for maintaining a predetermined degree of interleaving of two mutually interleaved corrugated strips during joining of these strips to other parts of an assembly, and to provide an improved process for manufacture of an expansion zone in a rotary regenerator matrix.

The nature of my present invention and its advantages will be clear to those skilled in the art from the following detailed description of preferred embodiments of the invention and the accompanying drawings thereof.

FIG. 6 is a fragmentary axonometric view illustrating steps in a process of manufacture of a structure as shown in FIGS. 3 to 5.

FIG. 7 is a view similar to FIG. 6 illustrating a second embodiment of the process.

FIG. 8 is a view similar to FIG. 6 illustrating a third embodiment of the process.

My process may best be understood after a brief description of the structure for the manufacture of which it was conceived. If further details of this structure are needed, reference may be made to my abovementioned companion application.

Figure 1:
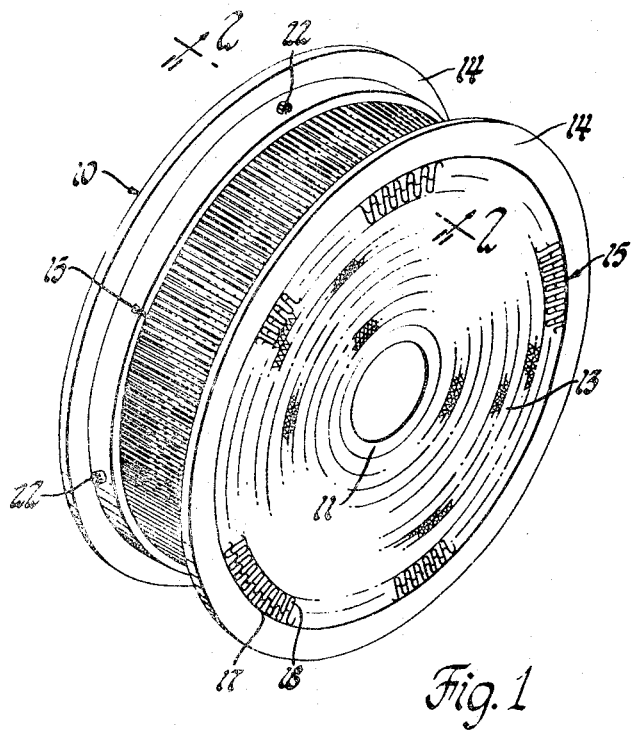
FIG. 1 is an axonometric view of an axial-flow regenerator matrix.

Referring to the drawings, FIG. 1 shows an axial-flow regenerator matrix which, except as pointed out hereafter, may be of conventional or known type suited for use in regenerators of the sort shown in U.S. Pat. No. 3,368,611 of Bracken et al. for Rotary Regenerator Seal with High Pressure Fluid Recovery, filed Feb. 13, 1968.

The matrix 10 of FIG. 1 comprises a cylindrical hub 11 surrounded by a cylindrical or disk-shaped body 13 of heat transfer material which preferably is defined by alternating flat and corrugated strips of thin sheet metal wrapped spirally around the hub so as to provide passages extending generally axially of the matrix through the corrugations. The matrix also includes two seal rings 14, each of which is an L-section band extending around the periphery of the heat transfer material and spaced from it (see also FIG. 2). Rings 14 provide a surface on their outer radial faces for engagement with seals which define the boundaries of the motive fluid path through the matrix.

The matrix also includes an interconnecting structure 15 coupling the heat transfer body to the rings 14. It will be understood, of course, that the interconnecting structure 15 is shown to larger than normal scale in FIG. 1 and the heat transfer body is more grossly enlarged. This is a very fine structure, and thus the rendition of the drawings is not to scale.

Referring also to the other figures of the drawing, it will be seen that the interconnecting structure 15 comprises a radially outer corrugated strip or sheet 17 and a radially inner corrugated sheet or strip 18. Preferably, the corrugations have substantially parallel side walls joined by arcuate return bends so that the sheets have peaks on each corrugation adapted to extend into the valleys of the other corrugated sheet and to slide radially without undue effort, as indicated by the broken lines in FIG. 4. There is preferably a slight deformation or elastic squeezing together of the corrugations in parts 17 and 18 where they interengage, or at least a rubbing fit between them to minimize leakage. However, a looser fit can be satisfactory in some cases.

The outer corrugated sheet 17 is brazed at the outer peaks 19 of the corrugations to the exterior structure and the inner corrugated sheet is brazed to the outermost sheet of the metal heat transfer body 13 at each peak 21 of the corrugations. The rubbing or mating surfaces of the two sheets 17 and 18 are coated during the brazing operation to prevent any brazing between them.

Figure 2:
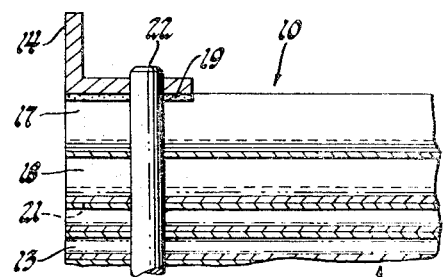
FIG. 2 is a detailed sectional view to a larger scale taken on a radial plane indicated by the line 2—2 in FIG. 1.

The seal rings 14, as shown in FIG. 2 are connected to the heat transfer body 13 by several circumferentially spaced radial pins 22 (FIGS. 1 and 2) which are slidable either in the ring 14 or in the body so that they permit relative expansion but prevent axial shifting.

Figure 3:
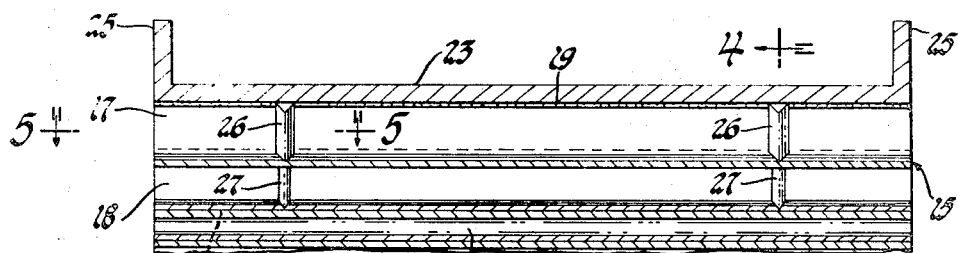
FIG. 3 is a view similar to FIG. 2 illustrating a second form of the matrix.
Figure 4:
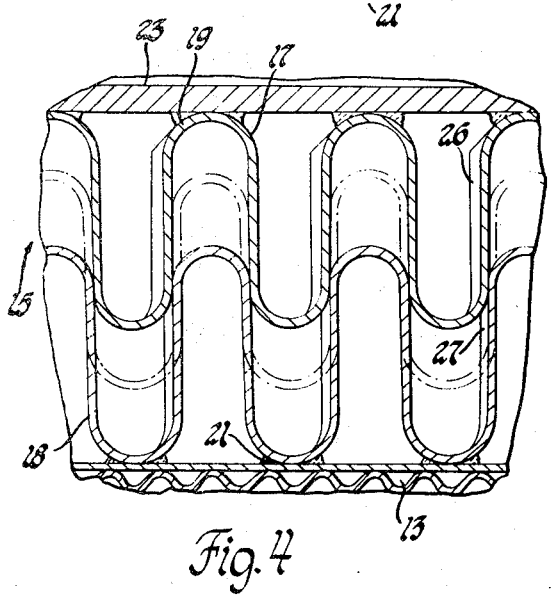
FIG. 4 is a still further enlarged sectional view taken perpendicular to the axis of the matrix as indicated by the line 4—4 in FIG. 3.
Figure 5:
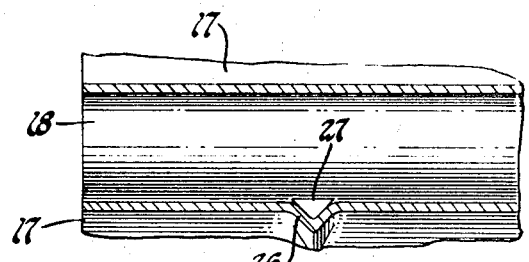
FIG. 5 is a fragmentary sectional view taken on the plane indicated by the line 5—5 in FIG. 3.

FIGS. 3 and 4 show a matrix structure in which a rim 23 extends across the entire axial length of the outer periphery of the matrix, rim 23 as shown having flanges 25 which serve as sealing rings similar to the rings 14 of FIG. 1. These figures show an alternative method of interlocking the sheets 17 and 18 to prevent relative shifting axially of the matrix. In this form small radial ridges or keys 26 and 27 are formed on one side of the corrugation of the sheets 17 and 18, respectively. The radial ridges 27 lodge in and may slide radially in the ways defined by the inner face of ridges 26, as indicated in FIGS. 3, 4, and 5. One or more sets of such ridges may be provided and, as will be clear, they serve as a keying arrangement to prevent axial shifting of the two corrugated sheets 17 and 18. The ridges 26 and 27 may be formed on the sheets as a part of the process of corrugating. Ridges may be on all corrugations, or some may be skipped.

Any relative expansion between the body of the matrix and the rim is easily accommodated by sliding of the two corrugated sheets 17 and 18 within each other. In the illustrated matrix two feet in diameter, of 304 L stainless steel, the radial movement between parts 17 and 18 is about 0.02 inch at the cold face of the matrix and about 0.14 inch at the hot face. In this case, the corrugations in sheets 17 and 18 are about 0.32 inch deep. Sheets 17 and 18 may constitute a continuous ring or a ring with one or more gaps if desired.

The fabrication of the structure is relatively simple, the major problem being that of maintaining proper contact between the corrugated sheets of the interconnecting structure and the parts of the matrix with which they are to be connected during the brazing operation. For example, in making the structure of FIGS. 3, 4, and 5, the two corrugated strips or sheets 17 and 18 are interleaved or interdigitated and laid around the body 13 of the matrix, and the rim 23 is slipped over the outer sheet 17. Since the corrugations can slide into each other, something is needed to maintain concentricity of the parts 13 and 23 and to assure positive contact of the peaks at 19 and 21 of the corrugations with the parts to which they are to be brazed or otherwise connected. If the corrugations slide into each other differentially at different parts of the matrix, the width of the corrugations may be caused to vary from point to point and the structure thus produced would tend to run eccentric in operation. Also, if contact between any peak of a corrugation and the structure to which it is to be joined should fail because the structure is supported by adjacent corrugations which have not penetrated so deeply, the proper bonding of the parts would not take place.

Basically, according to my invention, the corrugated sheets 17 and 18 are provided with some excess width so that they extend axially of the matrix beyond the surface of the heat transfer body and the ring or rim at each face of the matrix. The axially extending portion of one or both of the corrugated sheets is crimped or otherwise deformed at each face of the matrix to provide a stop or interlock between the two corrugated sheets 17 or 18 controlling the depth of interengagement of the corrugations. Thus, the interconnecting structure defined by the two sheets 17 and 18 has a constant overall dimension in the radial direction between the body of the matrix and the rim. This dimension may be such as to provide a slight interference fit between the interconnecting structure and the adjacent structures so that there is contact at each peak of the corrugations with adjacent structures and so that the rim and the matrix heat transfer structure are maintained concentric.

With the parts in this relation, the brazing or other bonding of one or both corrugated sheets 17 or 18 to adjacent structures may readily be accomplished. After this assembly has been accomplished, the axially extending surplus portion of the corrugated sheets are machined away, as by electric discharge machining, for example, thus removing the stops and providing a structure with freedom for variable expansion of the parts 13 and 23.

The blocking structure may be provided in various ways, three of which are illustrated in FIGS. 6, 7, and 8 of the drawings. Considering first FIG. 6, the sheet 17 has marginal portions 37 and the sheet 18 has marginal portions 38, these being ultimately machined away back to the plane defined by the broken lines 39 and 40.

The stop means 41 controlling the depth of engagement of the two corrugated strips 17 and 18 is provided by folding in the ends of the corrugations of sheets 17 as indicated at 42. This folding or deformation of the sheet 17 may be accomplished as a part of the corrugating operation by suitable configuration of the corrugating rolls or may be accomplished as a part of the operation of cutting a wide sheet into narrower sheets or strips. The foldings 42 are disposed beyond the cutoff plane and thus this structure, which limits the penetration of the two sheets, is removed by electric discharge machining after the completion of the assembly.

The assembly is completed preferably by brazing the peaks of the corrugations to the rim 23 as indicated at 19 in FIG. 4. If the inner strip 18 is brazed to an adjacent structure, this also might be accomplished at the same time as indicated at 21 in FIG. 4. In some cases the interleaved corrugated sheets may be fixed to only one adjacent structure by brazing or the like. For example, the loops 43 of the corrugations of inner sheet 18 might engage in grooves or the like in the structure to which it connects. While brazing is the preferred method of joining the parts, it may be noted that other means of joining suitable to the particular assembly may be used, such as welding, diffusion bonding, or cementing by any suitable adhesive, for example.

Thus, to sum up the process of FIG. 6, the parts 23, 17 and 18 in the form illustrated are provided and are laid one upon the other with the depth of engagement of the corrugations controlled and, as pointed out, the parts which are to slide within each other are coated with stop-off or the like and the sheet 17 is brazed or otherwise fixed to the ring body or sheet 23. At the same time, the loops 43 may be brazed to an adjoining body or sheet such, for example, as the heat transfer body 13. Thereafter, the surplus ends of the sheets 17 and 18 are machined to the desired plane by electrical discharge machining or other process suited to the thin and easily deformed metal sheets 17 and 18.

FIG. 7 shows a different mode of operation to achieve the control of depth of engagement of the corrugations. In this case, the corrugated sheets 17 and 18 have projecting excess portions 47 and 48, respectively, at each end of the corrugations which are ultimately trimmed off to the plane defined by the broken lines 39 and 40. In FIG. 7, each side wall of each corrugation is deformed at the edges 47 and 48 of the sheets to provide a small V-shaped bulge 49. As shown, the bulge preferably tapers away from the edge of the sheet and the bulges on the adjacent sheets engage to form a detent between the two corrugated sheets at each side of each corrugation at both faces of the matrix. The bulges provide a sufficiently high resistance to movement of the two sheets relative to each other to insure adequate contact during brazing. As before, this portion of the sheets is machined off after the brazing is completed. It will be noted that the detent provided by the bulges 49 locates the two sheets against movement apart as well as together, which may be advantageous in handling the material in some cases.

FIG. 8 shows still another embodiment. In this case, the marginal portions 57 and 58 of the two sheets are slit as indicated at 59 and the end portion is bent over to provide stops or tabs 60 and 61 which extend generally parallel to the direction of the corrugated sheets and which lie one on top of another when the corrugations of the sheets are interengaged. This may also be formed as part of the corrugating or of cutting a wide sheet into narrower sheets, as in the other examples. Other than in forming the stop, the process for FIG. 8 is the same as for the other figures.

It will be understood that a sheet or body of any sort may underlie the loops 43 and be brazed or otherwise secured to it. Such a sheet is indicated in FIG. 4.

It will be seen that all the forms of my invention provide for securing uniform degree of interengagement of the corrugated sheets over the area to be treated and provide resistance to excessive interengagement of the corrugated sheets so that the corrugations remain evenly spaced and will solidly abut the surface to which they are to be joined.

The process is capable of being performed without complicated equipment. Apart from the provision of the stops on the corrugated sheets and the removal of the ends of the sheets to clean away the stops, the process may be the same as any process of brazing together metal parts to form a device such as the regenerator matrix illustrated. In this connection, it is usual practice to machine the surfaces of such matrices to provide a smooth surface for engagement by the seals, altogether apart from removing the special crimping illustrated in FIGS. 6, 7, and 8.

The detailed description of the preferred embodiment of the invention for the purpose of explaining the principles thereof is not to be considered as limiting or restricting the invention, as many modifications may be made by the exercise of skill in the art.

I claim:

1. A method of manufacturing a structure comprising an outer body, an outer corrugated sheet, an inner corrugated sheet, and an inner body, with the outer body connected to the outer sheet and the inner sheet connected to the inner body, and with the corrugations of the sheets slidably interdigitated, while temporarily limiting the extent of said interdigitation during manufacture, comprising forming stops on at least one of the sheets at the margins thereof effective to limit the extent of interdigitation, bonding at least one of the sheets to the adjacent body, and subsequently removing the marginal portions bearing the stops.

2. A method as recited in claim 1 in which the stops are formed on only one sheet.

3. A method as recited in claim 1 in which the stops are formed on both sheets.

4. A method as recited in claim 1 in which the stops are produced by forming interfitting bulges on the corrugations restraining the sheets against movement away from and toward each other.

5. A method as recited in claim 1 in which the margins are slitted and bent over to provide stops on both sheets.

6. A method as recited in claim 1 including bonding each sheet to the adjacent body.

7. A method of manufacturing a structure comprising first, second, third, and fourth bodies abutting in the order named, the second and third bodies being sheets having corrugations extending across the sheets with the peaks of the corrugations of each of the sheets slidably entering the valleys of the corrugations of the other sheet, and with the first and second bodies bonded together, comprising providing the said bodies, deforming marginal portions of at least one of the said sheets to provide a positive stop on each corrugation limiting the depth of entry of the corrugated sheets into each other, stacking the bodies with the corrugations of the sheets interleaved and the stops in engagement, bonding the first body to the second body, and removing the said stops.

8. A method as recited in claim 7 in which the stops are formed on only one sheet.

9. A method as recited in claim 7 in which the stops are formed on both sheets.

10. A method as recited in claim 7 in which the stops are produced by forming interfitting bulges on the corrugations restraining the sheets against movement away from and toward each other.

11. A method as recited in claim 7 in which the margins are slitted and bent over to provide stops on both sheets.

12. A method as recited in claim 7 including bonding each sheet to the adjacent body.

References Cited

UNITED STATES PATENTS

| 2,357,493 | 9/1944 | Alley et al. | 165—171X |
| 3,047,271 | 7/1962 | Burtt et al. | 29—157.3X |
| 3,166,118 | 1/1965 | Koch | 165—9 |
| 3,368,611 | 2/1968 | Bracken, Jr., et al. | 165—7 |
| 3,422,777 | 1/1969 | Plegat | 113—118 |

FOREIGN PATENTS

| 869,330 | 5/1961 | Great Britain. |

JOHN F. CAMPBELL, Primary Examiner

V. A. DiPALMA, Assistant Examiner

U.S. Cl. X.R.

29—418, 475; 113—118